B. M. LANGNES.
CONVERTIBLE PLANTER.
APPLICATION FILED DEC. 5, 1918.

1,300,419.

Patented Apr. 15, 1919.
2 SHEETS—SHEET 1.

WITNESSES:

INVENTOR
Bernhart M. Langnes
BY
Young & Young
ATTORNEY

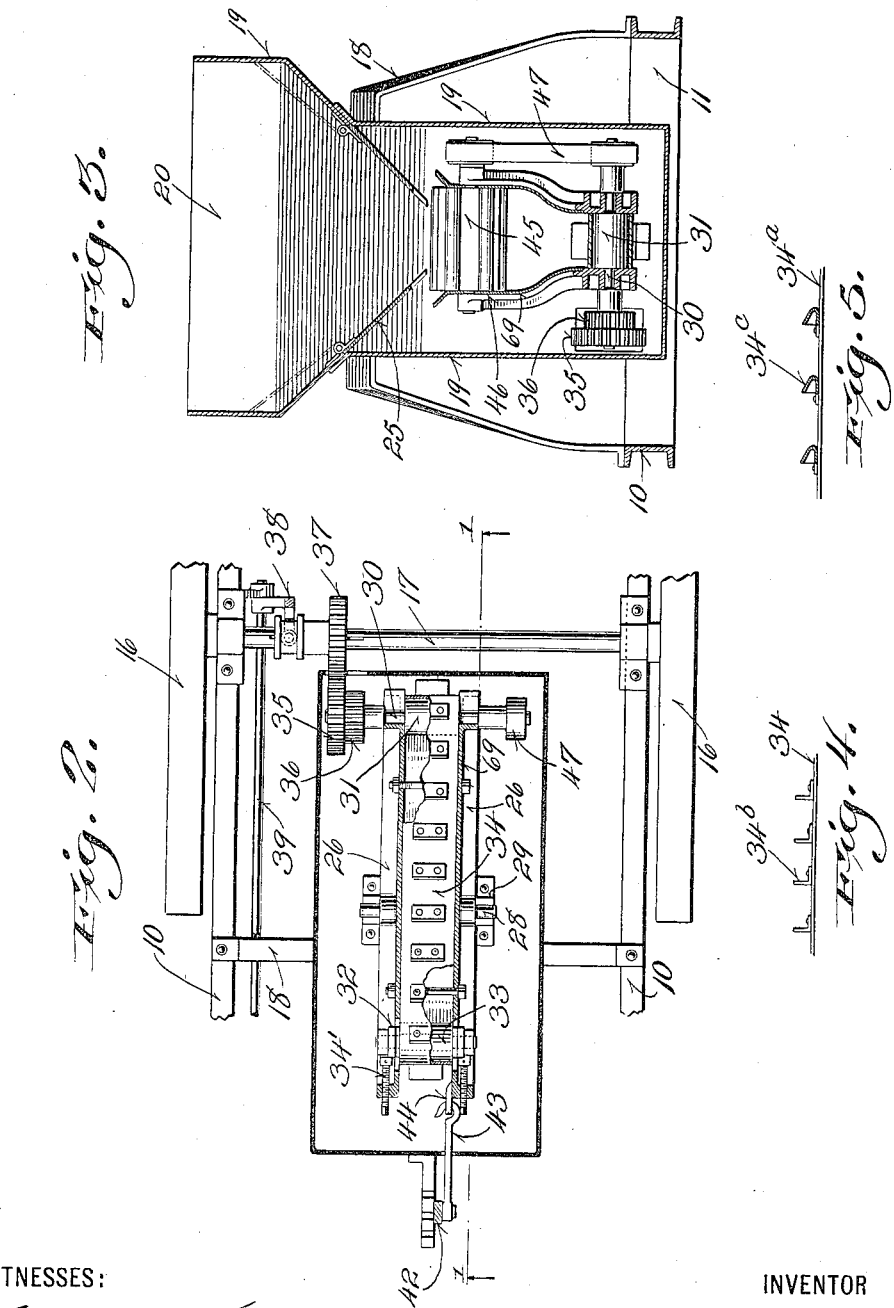

UNITED STATES PATENT OFFICE.

BERNHART M. LANGNES, OF KENOSHA, WISCONSIN.

CONVERTIBLE PLANTER.

1,300,419.  Specification of Letters Patent.  Patented Apr. 15, 1919.

Application filed December 5, 1918. Serial No. 265,384.

*To all whom it may concern:*

Be it known that I, BERNHART M. LANGNES, a citizen of the United States, and resident of Kenosha, in the county of Kenosha and State of Wisconsin, have invented certain new and useful Improvements in Convertible Planters; and I do hereby declare that the following is a full, clear, and exact description thereof.

My invention relates to new and useful improvements in wheeled planters, more particularly of that type which is convertible for efficiently planting potatoes or differing kinds of seeds.

It is in general the object of my invention to simplify and otherwise improve the structure and to increase the efficiency of machines of this character, as well as to provide for a most ready conversion of the machine for its various planting functions.

It is more particularly my object to provide a planter embodying an intermittent batch discharge which is effected by batch determining carriers on an endless belt fed from the main supply of seed, and a further and important object in this connection resides in the provision of an arrangement whereby belts having different batch determining carriers may be interchangeably employed for effecting different desired planting operations.

A further and important object resides in the provision of means for varying the planting intervals of the machine by procuring variation of the ratio of belt travel of the machine.

With the above and other objects and advantages in view, which will be apparent as the description proceeds, my invention resides in the novel features of construction, combination and arrangement of parts as hereinafter more particularly described and defined by the appended claims.

In the accompanying drawings:

Fig. 2 is a longitudinal sectional view through the feed belt carrier and associated parts.

Fig. 3 is a vertical sectional view through the hopper and feed roller on a plane indicated in general by the broken line 3—3 of Fig. 1.

Fig. 4 is an elevational view of a portion of one type of feed belt.

Fig. 5 is an elevational view of another type of feed belt, the seed holding cups thereof being in section.

Figure 1:
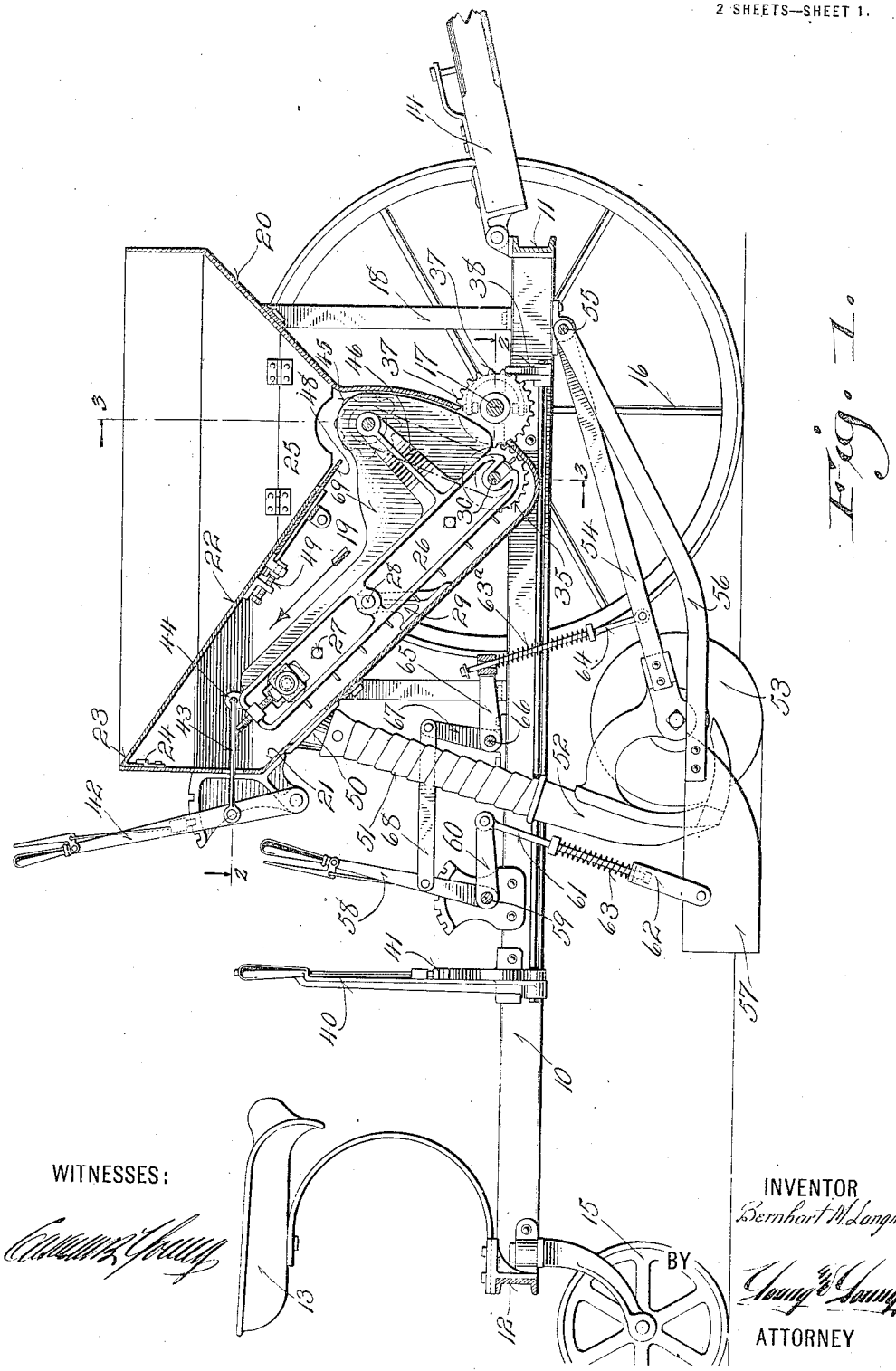
Figure 1 is a vertical longitudinal sectional view through my improved planting machine on a plane indicated in general by the line 1—1 of Fig. 2.

Referring now more particularly to the accompanying drawings, there is provided a main frame including side sills 10 and front and rear end sills 11 and 12, the rear end sill mounting a driver seat 13 while a draft tongue 14 is hinged to the front end sill. The rear portion of the frame is supported by a swivel wheel 15 secured to and movable under the rear sill 12, while the front portion of the machine is supported by wheels 16 fixed on a drive axle 17 which is journaled on the forward end portions of the side sills. A main casing for the seed distributing mechanism is mounted on uprights 18 at the forward portion of the frame and includes side walls 19 flared outwardly at their upper portions, and front and rear end walls 20 and 21 respectively which are convergent at their lower portions and merge into a bottom for the main casing, the relative inclination of the two walls being such that their meeting bottom portions are disposed rearwardly of and adjacent the drive axle 17, and extend a short distance below the horizontal plane thereof. The upper portion of the main casing forms the main supply hopper of the machine, while the lower portion of the casing forms a supplemental hopper and serves to house the batch forming belt structure. These portions of the casing are separated by a partition plate 22 which is adapted to fit obliquely in the rear portion of the main casing, in a position approximately parallel to the inclined lower portion of the rear wall 21 of the main casing. The upper rear edge portion of the partition plate is detachably secured to the main casing, preferably by engagement of a depending flange 23 in clip members 24 carried by the wall 21, the side edge portions of the plate resting against and being supported by adjacent inclined portions of the side walls 19. The lower forward edge portion of the partition plate defines a hopper discharge mouth in conjunction with the adjacent inclined portion of the front wall 20, and to restrict this hopper mouth transversely of the main casing, side partition plates 25 are hinged to the inclined portions of the side walls 19, forming continuations of the surfaces of said inclined wall portions, said plates 25 resting on the lower portion of the plate 22 and on the adjacent inclined portions of the front wall 20. By the foregoing construction, access may be readily had to the belt housing lower portion of the main casing for manipulating the belt structure, by swinging the partition plates 25 upwardly to the positions shown in Fig. 3 in dotted line, and then removing the bottom partition plate 22, after which the entire belt structure unit may be removed.

This belt unit comprises a pair of side carrier sills 26 which are detachably secured together by bolts 27 passed through their intermediate portions. The sills carry outwardly extending substantially centrally disposed fulcrum pintles 28 which seat in bearing brackets 29 upstanding from the intermediate inclined portion of the casing wall 21. The lower ends of the sills are bifurcated to form journal seats for the reception of a belt shaft 30 carrying a roller 31 on its portion between the sills. The upper end portions of the sills are slotted to slidably mount a pair of bearing boxes 32 carrying an upper belt roller 33. An endless feed belt 34 is trained about the boxes, and the tension of the belt is adjusted on screws 34 threaded in upper end portions of the sills and having swivel connection with the boxes 32. The pivotal mounting of the belt unit is utilized to procure a variable drive of the belt from the axle 17, and to effect this relatively large and small gears 35 and 36 respectively are mounted on the end of the shaft 30 and are adapted to selectively engage with a drive gear 37 splined on the axle 17 and projecting through the casing. This gear 37 is selectively shifted into position with either of the belt shaft gears by a spanner arm 38 engaging its hub and carried by a shaft 39 extending longitudinally of the machine. An upstanding lever 40 is carried on the rear end of the shaft and has pawl connection with a segment 41 for holding the gear 37 in either of its shifted positions. The pivotal position of the belt unit is controlled by a lever 42 pivoted at the rear upper portion of the main casing and carrying a pivoted link 43 extending into the casing and having its forward end hooked for engagement in an upstanding ear 44 on the upper end of one of the belt sills 27. The belt 34 may thus be driven at either high or low speed from the axle 17, or may be disposed in neutral position, with the gears out of mesh whereby propulsion of the machine over the ground will not drive the belt.

For procuring a positive feed of seeds from the main hopper, a longitudinally corrugated roller 45 is mounted on outwardly inclined arms 46 upstanding from the lower portions of the belt sills 26 and this roller is driven by a belt connection 47 between one of its pintles in the belt drive shaft 30. The roller 45 is thus driven coincident with the belt and is controlled in rotation by the control means of the belt. To vary the feed from the hopper, and to compensate for shifting movements of the roller 45 incidental to the shifting of the belt unit by which it is carried, a slide plate 48 is mounted at the lower portion of the bottom partition plate 22 and is held in position by a set screw 49 having swivel connection therewith and threaded in a lug of the bottom plate.

The upper end of the carrying stretch of the feed belt is disposed above a depending spout 50 carried by the rear main casing wall 21 and to which is secured an extensible boot 51 terminating at its lower end in a discharge shoe 52 disposed rearwardly of a furrow disk 53 and secured to the supporting beams 54 of said disk, these beams being extended forwardly of the machine and pivoted on a transverse shaft 55 under the frame. This pivot shaft also carries the forward ends of beams 56 which extend rearwardly and carry covering shoes 57 disposed rearwardly of the seed discharge shoe 52. The position of these various ground engaging members is controlled by a lever 58 carried by a transverse shaft 59 on the frame, which shaft also carries a forwardly extending crank arm 60 to which is pivoted a rod 61 passed through a connecting yoke 62 of the covering shoes 57, said rod being adapted to lift the shoes when the rod is raised, and having coiled thereon a spring 63 engageable with the yoke to impart yieldable pressure thereto when the rod is lowered. A rod 64 is pivotally secured to the rear portion of the beam 54 and has its upper end headed and passed through the free end of an arm 65 extending forwardly from a transverse shaft 66 on the main frame, a spring 63ª being mounted on this rod 64 and yieldably urging the disk 53 to ground engagement in lowered position of the arm. The shaft 66 carries an upstanding arm 67 connected by a link 68 with the lever 58 which thus affords a common control for the shoes and disk.

The feed belt 34 shown in Fig. 4 and in the assembled views is adapted for planting potatoes, having mounted thereon regularly spaced elevating blades 34ᵇ of such size as to engage and elevate a number of potato eyes sufficient for one hill. Other belts such as shown at 34ª in Fig. 5 may be provided for feeding corn or other grains, carrying elevating cups 34ᶜ of such size as to receive a sufficient number of kernels for a single planting, the cups of the different belts varying in size in accordance with the nature of the grain and the number of kernels to be planted in a batch.

In the operation of the machine, slide plate 48 is adjusted so as to permit only a sufficient discharge from the main hopper to fill the cups or blades of the feed belt in accordance with the speed at which the belt is traveling, seeds being guided to the cups or blades by guide plates 69 mounted on the belt sills 26 and bracket arms 46. Such seeds as might escape, fall into the bottom of the main casing and form an auxiliary supply taken up by the plates or cups as they move about the lower roller 31 and serve to maintain a constant fullness of the blades or cups and to compensate for possible slight variations of the feed of the main hopper.

A simple machine has thus been provided which is very positive in its planting operation, and which may be most readily adapted to meet differing planting conditions, either with respect to the nature of the crop planted or with respect to the desired spacing.

What is claimed is:

1. A planting machine including a main frame, ground wheels supporting the main frame, a pivoted belt frame mounted on the main frame, a shaft carried by said belt frame, a belt carried by the belt frame and trained about the shaft, selective speed gears on the shaft, a gear, means for driving said gear, means for holding the belt frame in differing pivotal positions to procure differing drive speeds of the belt, a hopper on the main frame, and batch determining members on the belt fed from the hopper.

2. A planting machine including a main frame, ground wheels supporting said frame, seat bearings on the main frame, a belt frame having pintles engageable in said seat bearings to pivotally and removably mount the belt frame, means for holding the belt frame in differing pivotal positions, a shaft carried by the belt frame, a belt carried by the belt frame and trained about the shaft, a shaft, means for driving said shaft, variable speed transmission gears on the shafts, a hopper on the main frame, and batch determining members on the belt fed from the hopper.

3. A planting machine including a main frame, ground wheels supporting said frame, seat bearings on the main frame, a belt frame having pintles engageable in said seat bearings to pivotally and removably mount the belt frame, means for holding the belt frame in differing pivotal positions, a shaft carried by the belt frame, a belt carried by the belt frame and trained about the shaft, a shaft, means for driving said shaft, variable speed transmission gears on the shafts, a hopper on the main frame, batch determining members on the belt fed from the hopper, and a feed roller adjacent the discharge mouth of the hopper carried by the belt frame and driven from the shaft of the belt frame.

4. A planting machine including a main frame, ground wheels supporting said frame, seat bearings on the main frame, a belt frame having pintles engageable in said seat bearings to pivotally and removably mount the belt frame, means for holding the belt frame in differing pivotal positions, a shaft carried by the belt frame, a belt carried by the belt frame and trained about the shaft, a shaft, means for driving said shaft, variable speed transmission gears on the shafts, a hopper on the main frame, batch determining members on the belt fed from the hopper, a feed roller adjacent the discharge mouth of the hopper carried by the belt frame and driven from the shaft of the belt frame, and guide plates upstanding at the sides of the belt frame.

5. A planting machine including a main frame, ground wheels supporting said frame, seat bearings on the main frame, a belt frame having pintles engageable in said seat bearings to pivotally and removably mount the belt frame, said frame including detachably connected sills, a shaft carried by the sills, a belt roller on the shaft, a second roller adjustably carried by the sills, a belt trained around said rollers, means detachably engageable with the belt frame for holding it in differing pivotal positions, a shaft, means for driving said shaft, variable speed transmission gears on the shafts, a hopper on the main frame, and batch determining members on the belt fed from the hopper.

In testimony that I claim the foregoing I have hereunto set my hand at Kenosha, in the county of Kenosha and State of Wisconsin.

BERNHART M. LANGNES.